May 5, 1942.  H. B. GIBBONS  2,282,221
GIRDER
Filed March 23, 1940  3 Sheets-Sheet 1
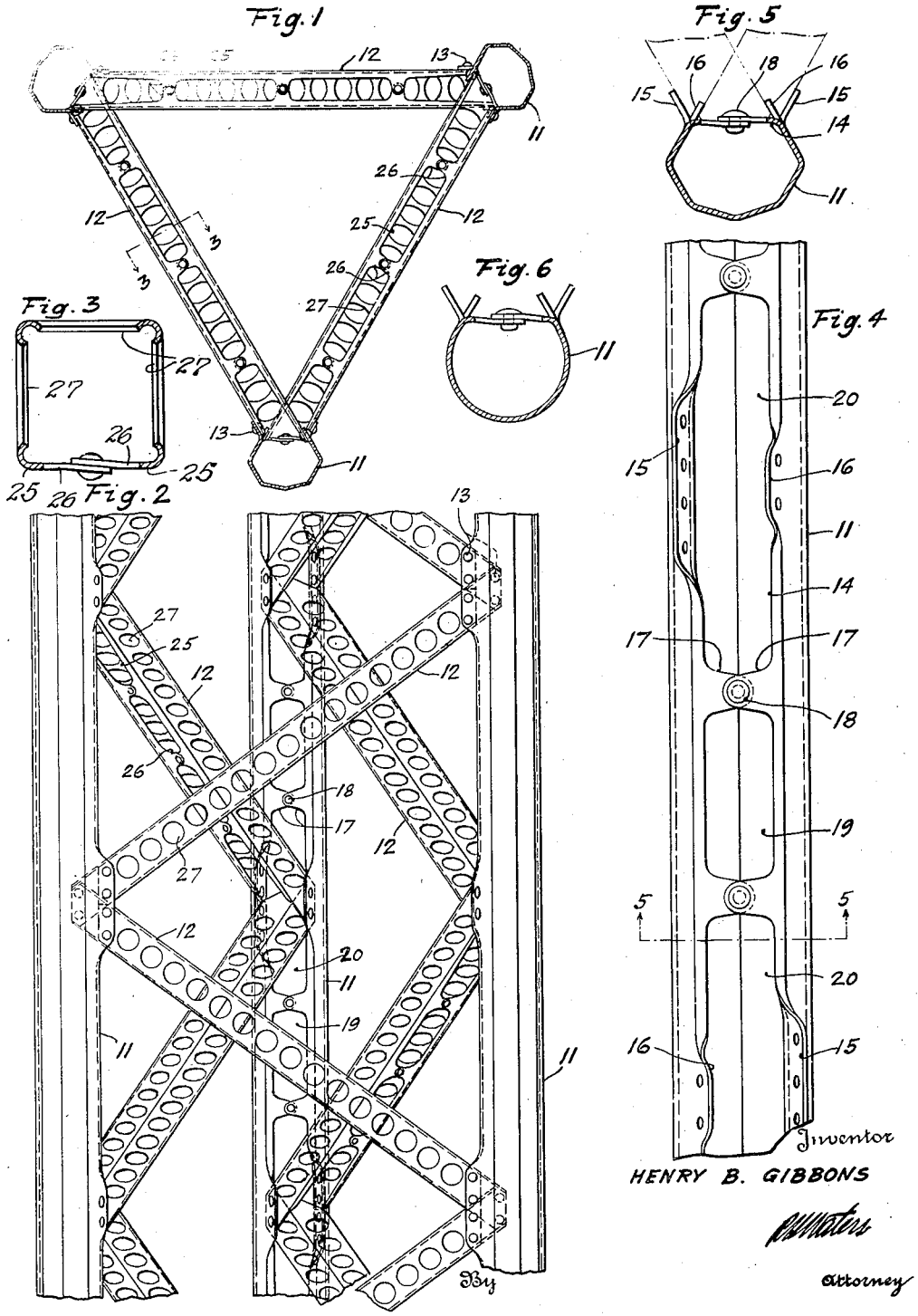
Inventor
HENRY B. GIBBONS
Attorney May 5, 1942. H. B. GIBBONS 2,282,221
GIRDER
Filed March 23, 1940 3 Sheets-Sheet 2
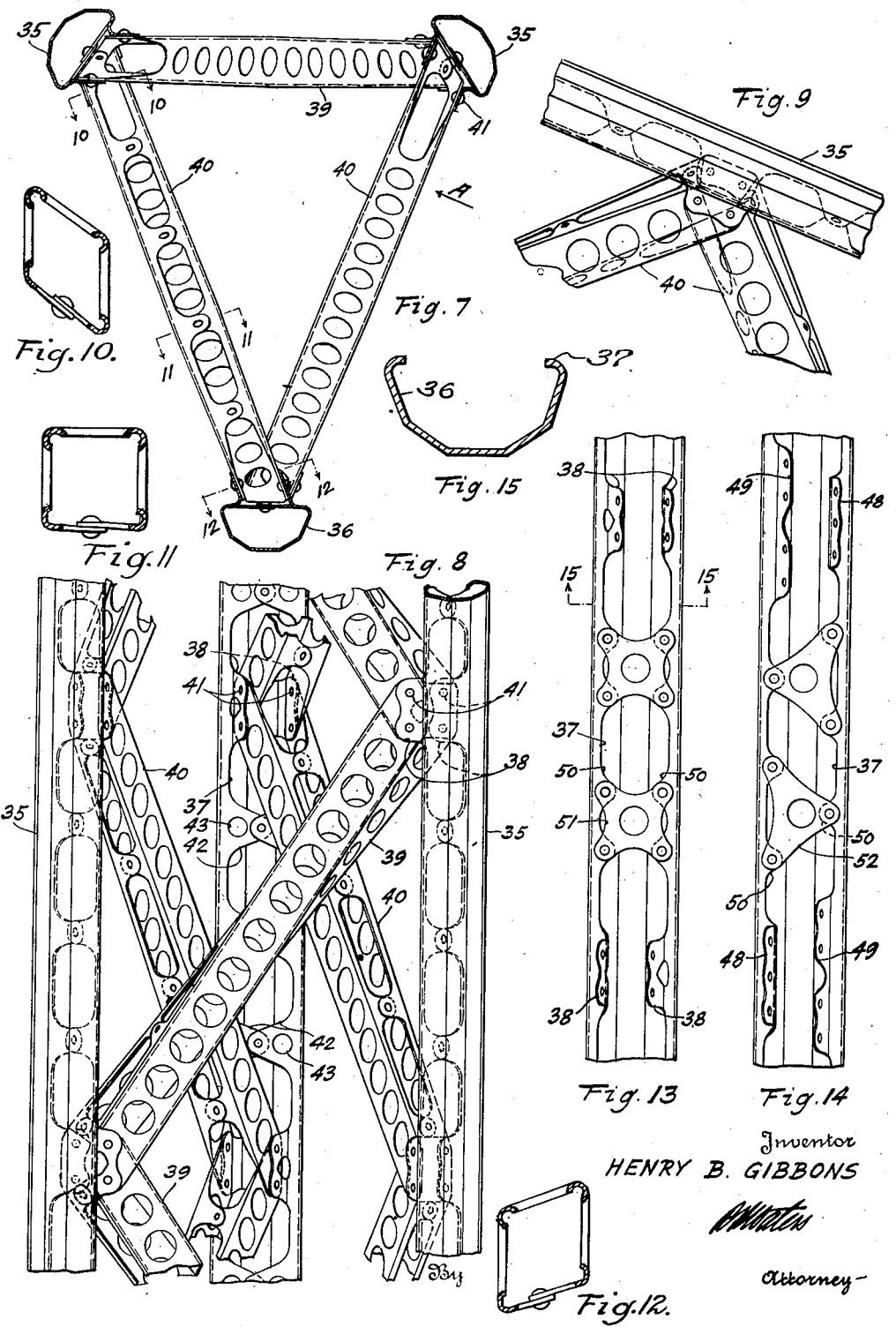
Inventor
HENRY B. GIBBONS May 5, 1942.  H. B. GIBBONS  2,282,221
GIRDER
Filed March 23, 1940  3 Sheets-Sheet 3
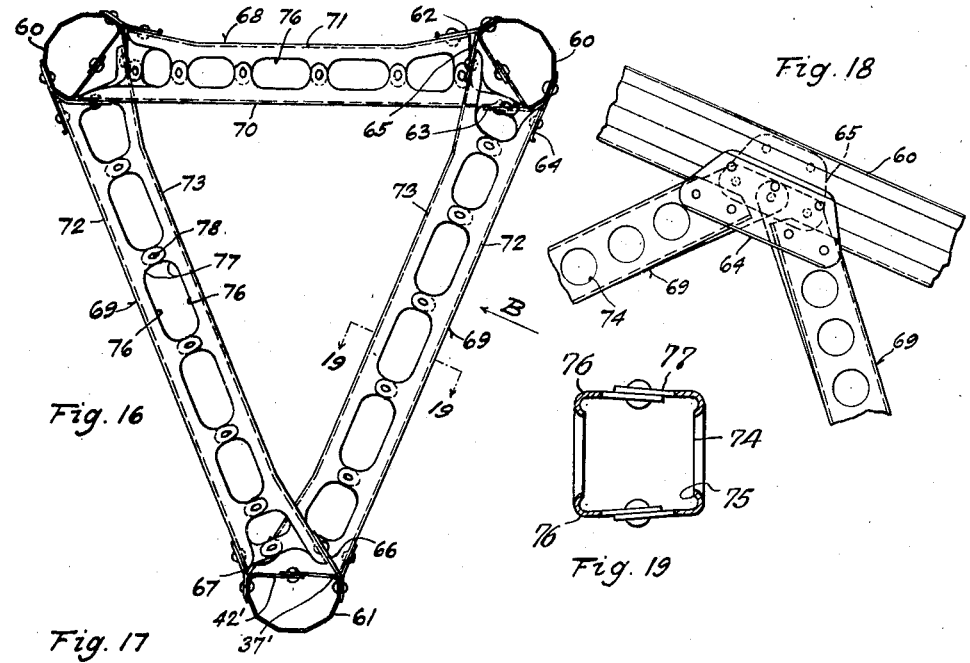
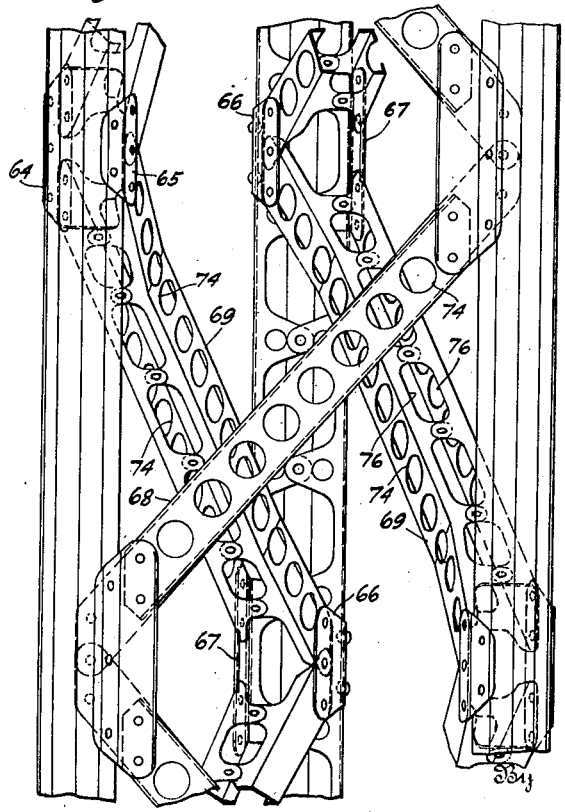
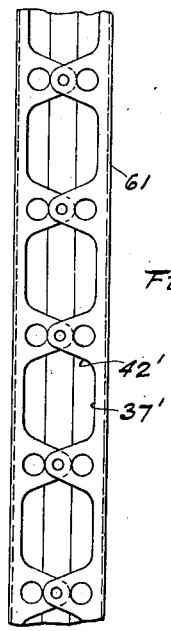
Inventor
HENRY B. GIBBONS
Attorney Patented May 5, 1942

2,282,221

UNITED STATES PATENT OFFICE 2,282,221

GIRDER

Henry B. Gibbons, Stratford, Conn., assignor, by mesne assignments, to Wingfoot Corporation, Akron, Ohio, a corporation of Delaware Application March 23, 1940, Serial No. 325,622

11 Claims. (Cl. 189—37)

This invention relates to the improvement of structural elements employed in the construction of aircraft and also for other purposes for which such construction may be applicable.

Particularly in the construction of rigid airships, which require a large number of structural girders, it is of great importance that the girder material is utilized to the fullest extent of its strength, in order to obtain a structure of least possible weight.

In the past it has been the practice to make the elements of such girders, like chord members and struts, mostly of open channel cross-section because it permits relatively easy assemblage of the parts. Open channel cross-sections are not always the most favorable to be employed for thin-gauge compression members, especially since the buckling strength of such members still leaves much to be desired. Girder elements having a closed cross-section usually stand up well against compression forces, but there is difficulty in joining them advantageously.

The object of this invention is to avoid these drawbacks and to improve the compression as will as the torsional strength of structural elements having open cross-section as much as possible with relatively small increase in weight.

Another object of this invention is to provide in a girder that is stamped out, an open channel section the facing edges of which are joined by contiguous portions bridging the space between the girders only at spaced intervals.

Another object of this invention is to prestress the parts or assembly preferably in the direction of the force generally applied thereto in service.

Other objects of the invention will appear hereinafter as the description of the invention proceeds, the novel features, arrangements and combinations being clearly set forth in the specification and in the claims thereunto appended.

For a better understanding of this invention reference will now be made to the accompanying drawings of which:

Fig. 1 is a cross-sectional view of a structural girder.

Fig. 2 is a plan view of a portion of the girder.

Fig. 3 is an enlarged cross-section of a strut, taken along the line 3—3 of Fig. 1.

Fig. 4 shows an enlarged side view looking in the direction of the open side of a portion of a chord channel.

Fig. 5 shows a cross-section of a chord channel of the girder, taken along the line 5—5 of Fig. 4.

Fig. 6 shows a modification of Fig. 5.

Fig. 7 shows the cross-section of a modified girder construction.

Fig. 8 is a plan view of a portion of a girder according to Fig. 7 looking from above in that figure.

Fig. 9 shows a fractional side view of Fig. 7 seen in the direction of the arrow A in Fig. 7.

Figs. 10, 11 and 12 show cross-sections of a strut, taken along the lines 10—10, 11—11 and 12—12, respectively, in Fig. 7.

Fig. 13 shows a modification of the chord member construction shown in Fig. 8.

Fig. 14 shows another modification of the chord member construction.

Fig. 15 shows the effective cross-section along the line 15—15 of a chord member.

Fig. 16 shows the cross-section of another modified girder construction.

Fig. 17 shows a plan view of a portion of the girder made according to Fig. 16.

Fig. 18 shows a fractional side view of Fig. 16, seen in the direction of arrow B.

Fig. 19 shows a cross-section of the strut taken along the line 19—19 of Fig. 16, and Fig. 20 shows a separate side view of the chord member shown in Fig. 17.

In the drawings, 11 designates the chord members of a triangular equilateral girder construction, and 12 the struts connecting the chords by rivets 13. The chords 11 are made of open channels which are provided with flanged edges 14. These flanges are extended as at 15 and 16 and suitably bent for the attachment of the struts 12. Between the strut attachments the flanged channel edges carry one or more pairs of extensions 17, which are connected by rivets 18. These connections reduce the buckling length of the free channel flange, increase the torsional stiffness of the chord member and hence its resistance to compression. Sufficiently large openings 19 and 20 are left for easy access of riveting and assembling tools.

The struts 12 in Figs. 1 to 3 inclusive which connect the chords 11 are of rectangular channel cross-section. The free edges of the channels are provided with flanges 25 for stiffening, and these flanges again have suitably spaced overlapping extensions 26, which are riveted together, thus forming a tubular member which to a very high degree is resistant against compressional and torsional forces. Three sides of the struts are provided with holes 27 for reducing the weight of the struts, the surrounding edges of which are flanged inwardly; the fourth side leaves large openings determined by the spaced connections 26 to permit easy assembling. The struts in each side of the girder are arranged in zig-zag fashion so that the apex of each pair of struts of one side halves the chord length between the base of the pair of struts on the adjacent side of the girder. This is the best strut arrangement to keep the free chord length as short as possible.

The chord members may be shaped as indicated in either Figs. 4 and 5 or in Fig. 6.

A modified construction, according to the invention, is represented in Fig. 7 by an isosceles triangular girder in which the chords 35 and 36 are provided with flanged longitudinal edges 37 from which extend pairs of ears 38 for the attachment of the struts 39 and 40 by rivets 41. In this case, however, the ears of each pair are made relatively short and of equal length in such a way that the chord channel in its developed state is symmetrical (see Fig. 8) and therefore requires fewer different tools in production and also fewer rivets for joining the struts. Overlapping extensions 42, integral with the flanges 37 and provided with holes 43 to lighten the structure are again arranged between the attachments for the struts. The struts 39 and 40 are in principle of similar construction as strut 12, described above, however with the difference that for joining the struts with the chords they are twisted as shown by the Figures 10 to 12 in order that they will connect with the spaced ears 38 arranged directly opposite each other.

It will be noted in Fig. 8 that adjacent struts are twisted oppositely. Also it is to be noted that the twisting is effected by moving the opposite faces of the struts angularly in substantially parallel planes, thus twisting substantially only the intermediate faces.

Comparison of the construction of the chord members is illustrated by the Figures 13 and 14, the first being provided with ears 38 for the attachment of twisted struts and the second being provided with ears 48 and 49 for struts of uniform cross-section like 12. In both cases the extensions 50, along the opposite longitudinal edges 37, are connected by separate plates 51 and 52, respectively, instead of being made overlapping. The plate 51 has two rivets at each side, whereas plate 52 has one rivet at one side and two at the other side to suit conditions. In some cases, separate plates might be preferable to integral extensions overlapping each other.

A further modification of a girder construction is shown in Figures 16 to 20. The chord members 60 and 61 are fabricated independently of the location of the strut connections and their overlapping connections 42', supporting the flanged edges 37' against each other, are equally spaced for the full length of the chord member. Instead of integral strut attachments, gusset plates 62 and 63 for the short side struts and 64, 65, 66 and 67 for the long side struts, riveted or otherwise fastened to the chord members, are provided. The struts 68 and 69, respectively, are not made in one piece but of two channels 70 and 71, and 72 and 73 respectively. The back of each channel contains holes 74 to lighten the channel and have surrounding flanged edges 75. Both side flanges 76 of the channels are provided with integral extensions 77, each one overlapping a corresponding one of the opposite channel and being connected together by rivets 78 or by some other way. With this construction it is possible to vary the height of the struts and to shape their ends for suitable connection with the chord members. Although this construction, owing to the gusset plates required, will be somewhat heavier than those described above, it is to be preferred for girders which are mainly subjected to bending or torsional forces.

Girder constructions according to this invention are a great deal more efficient in compression and torsion than former constructions. That has been proved by a number of tests, according to which the specific compression strength has been improved as much as 50%, or even more, depending on the thickness of the material. The thinner the material being used is, the greater is the relative gain over previous constructions. It should also be noted that the rigidity of the relatively light struts against deformation in being used as steps during assembling of the airship structure or during operation of the airship is much greater so that damages through such cause will hardly occur.

A further improvement of such structural members, particularly from the standpoint of fatigue resistance, has been developed by subjecting them to pre-stressing before or after installation in the finished structure, that is, prior to service. It is known that girder material, either as a single beam or as a composite girder is subjected to locked-up secondary stresses which are the greater, the more the material has been worked and the more rivets or connecting joints are applied. These locked-up stresses, if controlled, or properly oriented, can be extremely helpful from the viewpoint of fatigue resistance. However they are usually accidentally oriented in the finished structural member and in most cases have a detrimental effect on the fatigue resistance of the girder to pulsating or fatiguing loads.

The very practical method of pre-stressing the structural members to counteract certain types of stress concentration improves their fatigue resistance to an extraordinary degree and makes the locked-up stresses more or less ineffective or orients them in a direction that improves the fatigue properties against certain types of loading to a degree that in some cases may be even better than when initial stresses are not present. This method consists in subjecting the structural members to pre-stressing, either as single beams or as a composite girder before or after installation in the structure, as the case may be, usually in the direction in which the forces act on the member. The pre-stressing in the proper direction should be high enough to yield local parts of the material, depending on the amount of local stress concentrations or amount of local initial stresses (usually above 50% of its ultimate strength).

In some cases the direction of pre-stressing may not be in the direction of the principal loads, because of the characteristics of the material which is more critical in fatigue to tension loads than compression loads. For an example, a girder designed for torsion or bending loads which alternate equally in reversed directions, the best way of pre-stressing for fatigue improvement would be to pre-stress the girder in tension.

The efficiency of this method is substantiated by tests to which one of the girder types according to the invention has been suggested. Whereas before such a girder would resist in a vibration machine about 150,000 cycles of tension and compression in alternating succession, a girder of the same type, which was pre-tensioned, resisted more than 9 million cycles before the girder was cracked. That is such a remarkable improvement that no doubt exists of the efficiency of the new method applied. It is of course understood that the continuously reversible load, under which the material is tested, remains within the normal working limit of the structure in actual service.

The material to be considered in this invention shall include all metals suitable for the purpose as, for instance, alloys of aluminum, magnesium, iron, as well as plastic products, either in sheet form, extruded, or in any other condition.

Having thus described this invention in detail, it is to be understood that it shall not be restricted to the samples illustrated in the drawings, but shall include all variations and combinations possible coming within the spirit and scope of the claims attached.

Having thus fully described my invention, what I claim and desire to secure by Letters Patent of the United States is:

1. For an aircraft, a structural girder comprising at least two chord members, strut members connecting said chord members, the chord members as well as the strut members being made of sheet material and of open polygonal cross-section and having the opposed longitudinal edges at their open sides turned inwardly toward each other to lie substantially in a single plane, and suitably spaced transverse connections uniting the respective free inturned longitudinal edges of each of the chord members and the strut members, respectively, to increase the buckling strength of said chord members and strut members.

2. For an aircraft, a structural girder of triangular cross-section and made of sheet material comprising channel-like chord members and strut members connecting the chord members, the strut members being arranged in zig-zag fashion in such a way that the apex of a pair of struts on one side of the girder lies between the base of a pair of struts on the adjacent side of the girder, ears extending from the free edges of the chord members arranged in pairs for the attachment of the strut members, and at least one transverse connection between the free edges of each chord member lying between adjacent pairs of said ears.

3. In an aircraft structure, the combination with at least three spaced longitudinal chord members arranged in substantially parallel relation with each other and spaced in triangular formation, struts extending between pairs of ears on adjacent chord members at other than right angles to said chord members for connecting said chord members, the said struts being twisted to move opposite faces angularly with respect to each other in substantially parallel planes, and means for securing said struts in said twisted state at their ends to the adjacent ears.

4. In an aircraft structure, the combination with at least three spaced longitudinal chord members arranged in substantially parallel relation with each other and spaced in triangular formation, each of said chord members having spaced ears at opposite sides arranged in opposed relation to form pairs, with the ears of each pair arranged at the same positions longitudinally of said chord members, struts extending between pairs of ears on adjacent chord members at other than right angles to said chord members for connecting said chord members, and said struts being of polygonal cross-section with normally substantially flat faces and being twisted to move opposite faces angularly with respect to each other in substantially parallel planes to bring the opposite faces near the ends adjacent the ears to which they are to be connected, and means for securing some of said faces at their ends to the adjacent ears.

5. A device as set forth in claim 4 in which the chord members are of channel cross-section with said ears extending outwardly from the free edges thereof.

6. In an aircraft structure, the combination with at least three spaced longitudinal chord members arranged in substantially parallel relation with each other and spaced in triangular formation, each of said chord members having spaced ears at opposite sides arranged in opposed relation to form pairs, with the ears of each pair arranged at the same positions longitudinally of said chord members, struts extending between pairs of ears on adjacent chord members at other than right angles to said chord members for connecting said chord members, and said struts being of polygonal cross-section with normally substantially flat faces and being twisted to move opposite faces angularly with respect to each other in substantially parallel planes to bring the opposite faces near the ends adjacent the ears to which they are to be connected, and means for securing some of said faces at their ends to the adjacent ears, some of said struts being twisted in opposite sense to others of said struts.

7. For an aircraft, a structural girder of triangular cross-section and made of sheet material, comprising chord members, and strut members connecting said chord members, said chord members having, independently of the strut spacing, along their length uniformly spaced connections between and integral with their free longitudinal edges, each of said strut members consisting of two channels facing each other with their open sides, extensions suitably spaced opposite each other along the free edges of said channels and being connected together, and gusset plates attached to said chord members for joining said strut members with said chord members.

8. For an aircraft a structural girder of triangular cross-section and made of sheet material, comprising at least three chord members each of channel-shaped cross-section arranged substantially parallel with each other in triangular formation, pairs of ears of substantially equal length spaced longitudinally from each other integrally with the longitudinal free edges of said chord members, strut members of rectangular channel cross-section twisted to fit between and being connected to the pairs of ears of said chord members, at least one connection between each pair of ears on said chord channels spanning the open side thereof and a similar connection between the edges of the strut channels spanning the open side thereof, the connection between the edges of the chord channel being arranged in spaced relation to and between adjacent pairs of ears on the chord channel.

9. A girder formed of thin sheet metal parts comprising at least three substantially parallel spaced chord channels connected by struts to form a girder of polygonal cross-section, each channel being formed with integral inturned edges at the open side thereof to stiffen said edges, the said edges lying in substantially the same plane and having means for securing said edges together only at spaced points therealong, the intermediate portions of said edges being free and spaced from each other.

10. A device as set forth in claim 9 in which said means for securing said edges together comprises integral ears projecting from the said inturned edges and overlappingly secured to each other.

11. A device as set forth in claim 9 in which said channels are imperforate.

HENRY B. GIBBONS.